3,467,621
ACCELERATING VULCANIZATION OF RUBBER WITH THIAZOLYLTHIO DIALKYL-PYRROLIDINES
Charles G. Summers, Scott Depot, W. Va., assignor to Monsanto Company, St. Louis, Mo., a corporation of Delaware
No Drawing. Continuation-in-part of application Ser. No. 196,019, Apr. 11, 1962. This application Mar. 20, 1967, Ser. No. 624,200
Int. Cl. C08c 11/62
U.S. Cl. 260—41.5     7 Claims

ABSTRACT OF THE DISCLOSURE

The vulcanization of diene rubber with sulfur is accelerated by thiazolylthio 2,5-dialkylpyrrolidines.

---

This application is a continuation-in-part of application Ser. No. 196,019 filed Apr. 11, 1962, now abandoned, which application was in turn a division of application Ser. No. 854,547 filed Nov. 23, 1959, and now abandoned.

The present invention relates to a new class of thiazolylthio pyrrolidines which are characterized as accelerators of the vulcanization of rubber possessing good scorch resisting properties. Many good rubber vulcanizing accelerators unfortunately are so active as to develop to varying extents some vulcanization of the rubber compound during preliminary mixing and handling steps where the rubber stock is subjected to temperatures somewhat below normal vulcanizing temperatures. Such characteristic is commonly known as scorching tendency and such action results in the development of a finished product of somewhat inferior quality or, if the scorching is severe, may result in ruining the rubber stock. Consequently, the availability of accelerators speedy in action in the cure but with retarding action during the handling steps is much to be desired.

The products of the present invention have the general formula

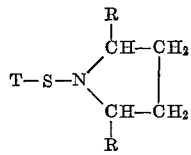

where R represents a lower alkyl group and T represents a thiazolyl group, preferably benzothiazolyl, which may be substituted, as for example it may contain a nitro, chloro, alkyl, alkoxy, or phenyl group in the benzene ring. While these are optional substituents, the lower alkyl groups in the pyrrolidine ring are critical for processing safety of rubber compositions.

The preparation and properties of the new compounds are described in further detail below:

Example 1

A 500 ml. round-bottom flask equipped with a stirrer, thermometer, condenser, and dropping funnel was charged with 93.3 ml. (15.98 g./100 ml.) of sodium hypochlorite solution. After cooling to 5° C., 21.8 grams (0.22 mole) of 2,5-dimethylpyrrolidine was added over a period of 45 minutes while maintaining the temperature at 4–6° C. Stirring was continued for 25 minutes and then 110.0 grams (0.2 mole) of 30.35% solution of mercaptobenzothiazole as the sodium salt was added over a period of 55 minutes at 4°–7° C. Thereafter the mixture was stirred for an additional 100 minutes at a temperature of 1°–2° C., transferred to a separatory funnel, and 150 ml. of ether added. The water layer was extracted with another 100 ml. of ether and the ether layers combined. After washing these combined extracts with a concentrated HCl-water (1:100) mixture, 1 ml. of 25% sodium hydroxide was added to make the ether extract alkaline. Washing with water three times at this point gave a neutral ether solution. After drying over sodium sulfate, the drying agent was filtered off and the filtrate stripped of ether solvent on a water bath, first under water vacuum and then at 4 mm. The 1-(2-benzothiazolylthio)-2,5-dimethylpyrrolidine was obtained in 79.4% yield as an amber oil insoluble in water but very soluble in ethanol, acetone, carbon tetrachloride, heptane, ether, benzene, and chloroform. Analysis gave 10.5% nitrogen and 24.1% sulfur as compared to 10.6% nitrogen and 24.3% sulfur calculated for $C_{13}H_{16}N_2S_2$.

Example 2

A solution of 5-chloro-2-mercaptobenzothiazole was prepared by mixing 50.5 grams (0.2 mole) of 5-chloro-2-mercaptobenzothiazole, 45 grams (0.28 mole) of 25% sodium hydroxide and 150 grams of water. The solution was warmed and filtered before use. Into a suitable reactor as described in Example 1, and cooled by means of an ice bath, there was charged 147 grams (15.2 g./100 ml.) of sodium hypochlorite solution. Thereupon there was added dropwise at 2.5°–7° C. 42.8 grams (0.432 mole) of 2,5-dimethylpyrrolidine. After this addition, which required 57 minutes, stirring was continued at 3° C. for an additional 30 minutes. The filtered 5-chloro-2-mercaptobenzothiazole solution was added over a period of one and one-half hours while maintaining the temperature at 3°–10° C. The product was stirred at 10°–13° C. for one hour and then extracted with two 150 ml. portions of ether. The ether layer was washed with water, neutralized with dilute hydrochloric acid, again washed with water, and dried over sodium sulfate. The ether was removed under water vacuum and then at 60° C./6 mm. The 1-(5-chloro - 2 - benzothiazolylthio)-2,5-dimethylpyrrolidine was obtained in 68.2% yield as a tan solid. After recrystallization from ethanol the product melted at 76°–81° C. It was insoluble in water but very soluble in ether, acetone, benzene, heptane, ethyl acetate, ethanol, and chloroform. Analysis gave 9.3% nitrogen and 21.5% sulfur as compared to 9.4% nitrogen and 21.1% sulfur calculated for $C_{13}H_{15}ClN_2S_2$.

Further examples of the new compounds comprise 1-(6 - ethoxy - 2 - benzothiazolylthio) - 2,5 - dimethylpyrrolidine, 1-(4 - phenyl - 2 - benzothiazolylthio)-2,5-dimethylpyrrolidine, 1-(6-nitro - 2 - benzothiazolylthio)-2,5-dimethylpyrrolidine, 1-(4-methyl - 2 - benzothiazolylthio)-2,5-dimethylpyrrolidine, 1-(2 - benzothiazolylthio)-2,5-diethylpyrrolidine, and 1-(5-chloro - 2 - benzothiazolylthio)-2,5-diethylpyrrolidine.

As an example of the accelerating activity of the products of this invention, vulcanizable compositions were compounded comprising:

| Stock | Parts by Weight | |
|---|---|---|
| | A | B |
| Smoked sheets rubber | 100 | 100 |
| Carbon black | 50 | 50 |
| Zinc oxide | 5 | 5 |
| Stearic acid | 3 | 3 |
| Saturated hydrocarbon softener | 3 | 3 |
| Sulfur | 2.5 | 2.5 |
| Antioxidant | 1.5 | 1.5 |
| Product of Example 1 | 0.5 | |
| Product of Example 2 | | 0.5 |

The stocks so compounded were cured in the usual manner by heating in a press for different periods of time at 144° C. The strength of the vulcanizates at optimum (30 minute) cure and 300% elongation is set forth below:

TABLE I

Modulus of elasticity in lbs./in.$^2$ at 300% elongation:
  Stock A _____ 2450
  Stock B _____ 2600

The processing safety of the uncured compositions was evaluated by means of a Mooney plastometer. The time required for incipient vulcanization or scorch was taken as the time required for the Mooney plasticity to rise 10 points above the minimum.

TABLE II

Stock:      Mooney scorch in minutes at 135° C.
  A _____ 13.4
  B _____ 14.1

The Mooney scorch of a similar stock containing as the accelerator 0.5 part of 1-(2-benzothiazolylthio)pyrrolidine was 10.5 minutes at 135° C.

As still further examples of accelerating activity and processing safety, rubber compositions were prepared which contained a retarder of vulcanization. Vulcanizable compositions were compounded comprising:

|  | Parts by Weight |  |  |
|---|---|---|---|
| Stock | C | D | E |
| Smoked sheets rubber | 100 | 100 | 100 |
| Carbon black | 50 | 50 | 50 |
| Zinc oxide | 5 | 5 | 5 |
| Stearic acid | 3 | 3 | 3 |
| Saturated hydrocarbon softener | 3 | 3 | 3 |
| Sulfur | 2.5 | 2.5 | 2.5 |
| Antioxidant | 1.5 | 1.5 | 1.5 |
| N-Nitroso diphenylamine | 1.0 | 1.0 | 1.0 |
| Product of Example 1 | 0.5 |  |  |
| Product of Example 2 |  | 0.5 |  |
| 1-(2-benzothiazolylthio)pyrrolidine |  |  | 0.5 |

Resistance to vulcanization at 135° C. of the stocks so compounded was determined as described above. Also determined was the strength of vulcanizates at 300% elongation prepared by heating in a press for different periods of time at 144° C. The results are set forth below:

TABLE III

|  | Cure time in mins. | Stock |  |  |
|---|---|---|---|---|
|  |  | C | D | E |
| Modulus of Elasticity in lbs./in.$^2$ at 300% elongation | 15 | 660 | (¹) | 1,480 |
|  | 30 | 2,180 | 2,180 | 2,050 |
|  | 45 | 2,400 | 2,630 | 2,140 |
| Mooney Scorch at 135° C. |  | 22.1 | 25.6 | 17.4 |

¹ No cure.

It will be noted from the cure results that the delayed action of the new compounds was such that no cure at all resulted after heating stock D for 15 minutes although after further heating the accelerating strength exceeded that of 1-(2-benzothiazolylthio)pyrrolidine. This supplies further evidence of processing safety of the new compounds. The Mooney scorch times demonstrate the processing safety even more dramatically.

A synthetic rubber base stock was compounded comprising:

Parts by weight
Styrene-butadiene copolymer rubber _____ 100
Carbon black (HAF) _____ 50
Zinc oxide _____ 4
Stearic acid _____ 2
Saturated hydrocarbon softener _____ 10
Antioxidant _____ 1.5
Sulfur _____ 1.75

To the base stock was added accelerator in amount of 0.0045 mole per hundred parts of rubber. The following standard testing procedures were used:

Curing _____ ASTM D15–54T.
Stress-strain _____ ASTM D412–51T.
Mooney scorch _____ ASTM D1077–49T.
Goodrich flexing _____ ASTM D623–52T.

Mooney scorch time was run at 135° C. Scorch time was taken as the total time in minutes required for the Mooney value to increase ten points above the minimum. Vulcanization time was taken as the time in minutes required for the Mooney value to increase from ten to thirty-five points above the minimum. The commercial accelerator, N,N-diisopropyl, 2-benzothiazolesulfenamide, noted for its remarkable processing safety was tested in the same base stock. The results which follow show increased processing safety but shorter vulcanization time after onset of vulcanization, stronger accelerating strength, and lower heat buildup as compared to the commercial accelerator.

TABLE IV

|  | N,N-diisopropyl 2-benzothiazole-sulfenamide | 1-(2-benzothiazolylthio)-2,5-dimethylpyrrolidine |
|---|---|---|
| Mooney scorch time | 46.5 | 56.2 |
| Vulcanization time | 10.6 | 5.7 |
| Modulus of elasticity at lbs./in.$^2$ at 300% elongation at indicated cure time in minutes: |  |  |
| 30 | 150 | 830 |
| 45 | 960 | 1,650 |
| 60 | 1,650 | 1,770 |
| Tensile strength at break in lbs./in.$^2$ at indicated cure time in minutes: |  |  |
| 30 | 400 | 2,860 |
| 45 | 3,000 | 3,680 |
| 60 | 3,300 | 3,640 |
| Ultimate elongation percent at indicated cure time in minutes: |  |  |
| 30 | 1,140 | 830 |
| 45 | 750 | 580 |
| 60 | 560 | 550 |
| Goodrich flexometer at 100° C., temperature rise in ° C. | 30 | 26 |

Replacing the accelerator of stock A with 0.5 part of N,N - diisopropyl 2 - benzothiazolesulfenamide and comparing the results showed that stock A possessed more processing safety but shorter vulcanization time after onset of vulcanization, stronger accelerating strength, and lower heat buildup. The advantages of the new accelerators are believed to be attributable to the steric effect of the amine group. The delayed action of 1 - (2 - benzothiazolylthio) - 2,5 - dimethylpyrrolidine was less than that of N - cyclohexyl 2 - benzothiazole sulfenamide and of 2,2' - dithiobis(benzothiazole) in a gum stock. The reversal of the relative delayed action in the presence of carbon black can be attributed to the steric effect of the methyl groups adjacent to the amine nitrogen. Carbon blacks increase tendency to scorch, but the loss of processing safety due to presence of carbon black is reduced due to the steric effect. However, the introduction of methyl groups next to nitrogen in the piperidine ring of 1 - (2 - benzothiazolylthio)piperidine did not increase processing safety in SBR rubber.

The accelerating properties of 1 - (2 - benzothiazolylthio)pyrrolidine have not been heretofore described. Zaucker et al. Re. 19,286, Aug. 21, 1934, suggested pyrrolidine for use in preparing a thiazole-sulfenamide accelerator. Preparation by early techniques for making sulfenamides yielded oils devoid of delayed action. Actually, pure 1 - (2 - benzothiazolylthio)pyrrolidine is a crystalline solid, M.P. 54°–55° C. The product reported by Reppe et al., Chemical Abstracts, vol. 50, col. 16782 (1956), as 2 - benzothiazolylsulfenpyrrolidide, M.P. 178° C., was evidently disulfide.

One of the specialized problems of rubber compounding is to develop a suitable vulcanizing system for styrene-butadiene re-tread rubber. The essential requirements are that the stock must vulcanize in very short time periods at mild temperatures but must not set up (scorch) during shelf storage. Shelf storage is usually defined as a minimum of three months at room temperature. Not more than 10% of the physical properties originally obtainable upon vulcanization must be lost during storage. That the requirements are technically contradictory constitutes the crux of the problem. In commercial practice a combination of sulfenamide accelerator with a secondary accelerator as activator achieves a compromise. The following re-tread stock retained processing safety after aging and exhibited desirable low heat buildup. The processing safety after aging was superior to that of a commercial control containing N-cyclohexyl 2-benzothiazole sulfenamide.

| | Parts by weight |
|---|---|
| Oil-extended styrene-butadiene copolymer rubber (SBR–1803) | 175 |
| Carbon black (FEF) | 30 |
| Zinc oxide | 3 |
| Stearic acid | 1.5 |
| Aromatic oil plasticizer | 15 |
| Hard hydrocarbon | 5 |
| Antioxidant | 0.5 |
| 1-(2-benzothiazolylthio)-2,5-dimethylpyrrolidine | 1.3 |
| Tetramethyl thiuram monosulfide | 0.25 |
| Sulfur | 2.5 |

The methyl substitution in the pyrrolidine ring exerts a stabilizing influence. A mixture of one part of sulfur and 8.19 parts by weight of 1 - (2 - benzothiazolylthio)-2,5 - dimethylpyrrolidine was subjected to differential thermal analysis and compared to results from similar analysis of one part of sulfur admixed with an equimolar amount (7.39 parts by weight) of unsubstituted 1 - (2 - benzothiazolylthio)pyrrolidine. An exothermic reaction was observed with the unsubstituted compound at about 51° C. followed by an exothermic decomposition at 115° C. The first exotherm was observed at 80° C. with the methylated compound and the second at 126° C.

It is intended to cover all changes and modifications of the examples of this invention herein chosen for purposes of disclosure which do not constitute departures from the spirit and scope of the invention.

What is claimed is:

1. A process of vulcanizing sulfur-vulcanizable diene rubber, a major proportion of which is conjugated diene hydrocarbon, which comprises heating said rubber having incorporated therein sulfur, carbon black, and an accelerating amount of 1 - (2 - benzothiazolylthio) - 2,5-dimethylpyrrolidine or 1 - (5 - chloro - 2 - benzothiazolylthio)-2,5-dimethylpyrrolidine.

2. The process of claim 1 in which the stock contains an aromatic nitrosoamine retarder.

3. The process of claim 1 in which the accelerator is 1-(2-benzothiazolylthio)-2,5-dimethylpyrrolidine.

4. The process of claim 1 in which the accelerator is 1 - (5 - chloro - 2 - benzothiazolylthio) - 2,5 - dimethylpyrrolidine.

5. A sulfur-vulcanizable diene rubber, a major proportion of which is conjugated diene hydrocarbon, having incorporated therein sulfur, carbon black, and an accelerating amount of 1 - (2 - benzothiazolylthio) - 2,5-dimethylpyrrolidine or 1 - (5 - chloro - 2 - benzothiazolylthio)-2,5-dimethylpyrrolidine.

6. A composition of claim 5 wherein the accelerator is 1-(2-benzothiazolylthio)-2,5-dimethylpyrrolidine.

7. A composition of claim 5 wherein the accelerator is 1 - (5-chloro - 2-benzothiazolylthio)-2,5-dimethylpyrrolidine.

References Cited

UNITED STATES PATENTS

| | | | |
|---|---|---|---|
| 2,772,278 | 11/1956 | Hardman | 260—306.6 |
| 2,816,881 | 12/1957 | Sullivan et al. | 260—79.5 |
| 2,822,367 | 2/1958 | Alliger | 260—306.6 |
| 2,875,208 | 2/1959 | D'Amico | 260—306.6 |
| 3,154,517 | 10/1964 | D'Amico | 260—786 |

OTHER REFERENCES

Reppe et al.: Chemical Abstracts, volume 50, col. 16782 (1956).

MORRIS LIEBMAN, Primary Examiner

S. L. FOX, Assistant Examiner

U.S. Cl. X.R.

260—306.6, 786